(12) United States Patent
Peterson et al.

(10) Patent No.: US 12,349,624 B2
(45) Date of Patent: Jul. 8, 2025

(54) PORTABLE TOOL WITH ADJUSTABLE GRIPPING ASSEMBLY

(71) Applicant: ECHO INCORPORATED, Lake Zurich, IL (US)

(72) Inventors: Brent Peterson, Buffalo Grove, IL (US); Peter D. Kim, Vernon Hills, IL (US)

(73) Assignee: Echo Incorporated, Lake Zurich, IL (US)

( * ) Notice: Subject to any disclaimer, the term of this patent is extended or adjusted under 35 U.S.C. 154(b) by 377 days.

(21) Appl. No.: 17/969,508

(22) Filed: Oct. 19, 2022

(65) Prior Publication Data

US 2024/0130277 A1 Apr. 25, 2024
US 2024/0224852 A9 Jul. 11, 2024

(51) Int. Cl.
| | |
|---|---|
| *A01D 34/90* | (2006.01) |
| *A01D 34/416* | (2006.01) |
| *A01D 34/82* | (2006.01) |
| *B25F 5/02* | (2006.01) |

(52) U.S. Cl.
CPC ......... *A01D 34/902* (2013.01); *A01D 34/416* (2013.01); *A01D 34/824* (2013.01); *B25F 5/026* (2013.01)

(58) Field of Classification Search
CPC .. A01D 34/902; A01D 34/824; A01D 34/416; B25F 5/026; B25G 1/066; B25G 1/102
See application file for complete search history.

(56) References Cited

U.S. PATENT DOCUMENTS

| | | | | |
|---|---|---|---|---|
| 1,534,075 A | * | 4/1925 | Parrish | A01B 1/026 294/58 |
| 5,867,911 A | * | 2/1999 | Yates | A01D 34/90 30/296.1 |
| 6,581,246 B1 | * | 6/2003 | Polette | A01D 34/90 16/444 |
| 9,507,371 B1 | * | 11/2016 | Day | G05G 1/54 |
| 11,597,061 B2 | * | 3/2023 | Ellice | B25F 5/026 |
| 2002/0004989 A1 | * | 1/2002 | Schweigert | A01D 34/902 30/340 |

(Continued)

*Primary Examiner* — Christopher J Sebesta
*Assistant Examiner* — Julia C Tran
(74) *Attorney, Agent, or Firm* — Wood, Phillips, Katz, Clark & Mortimer (57) ABSTRACT

A portable tool having an upright starting orientation in which the portable tool has a top and bottom, a front and rear, and laterally spaced sides. The portable tool has an elongate frame and is configured to be held with the user engaging: a) a first back region of the portable tool with one of the user's hands; and b) a second region of the portable tool forward of the first back region with the user's other hand to thereby allow the user to elevate and reposition the portable tool. A drive operates a working unit on the frame. The first back region and second region are spaced along a front-to-rear first line. A gripping assembly at the second region of the portable tool has an elongate gripping length extending in a second line. A first vertical plane parallel to the first line is non-orthogonal to a second vertical plane parallel to the second line. The elongate gripping length can be moved selectively forwardly and rearwardly relative to the frame.

20 Claims, 7 Drawing Sheets

(56) References Cited

U.S. PATENT DOCUMENTS

| | | | |
|---|---|---|---|
| 2006/0096135 A1* | 5/2006 | Shaffer | E01H 5/04 37/244 |
| 2008/0040892 A1* | 2/2008 | Jenkins | B25G 1/06 16/426 |
| 2008/0092398 A1* | 4/2008 | Hurley | A01D 34/905 30/276 |
| 2009/0178520 A1* | 7/2009 | Engelfried | B25F 5/026 81/489 |
| 2012/0048581 A1* | 3/2012 | Yamada | A01D 34/824 30/276 |
| 2013/0047802 A1* | 2/2013 | Vierck | A01D 34/902 16/110.1 |
| 2014/0260839 A1* | 9/2014 | Hurley | B25F 5/026 81/489 |
| 2017/0295721 A1* | 10/2017 | Carl | A01D 34/902 |
| 2019/0357436 A1* | 11/2019 | Hamilton | A01D 34/824 |
| 2020/0171644 A1* | 6/2020 | Piotrowski | A01B 1/026 |

* cited by examiner

PORTABLE TOOL WITH ADJUSTABLE GRIPPING ASSEMBLY

BACKGROUND OF THE INVENTION

Field of the Invention

This invention relates to portable tools, such as stick tools, and, more particularly, to a portable tool having an adjustable gripping assembly that can be engaged by a hand of a user.

Background Art

A multitude of portable tools are currently available with designs wherein a user engages the portable tool with his/her hands at spaced locations to allow lifting and reorientation of the tool to control the positioning of a working unit thereon.

One category of portable tools of this type is used in the landscape industry. This category is commonly characterized as "stick tools". Generally, an elongate frame—commonly having a tubular length portion—supports a working unit at a forward region of the frame and a drive for the working unit either in the vicinity of the working unit or at or towards a rear end of the frame. The rear region of the tool is configured to be engaged by one hand of a user. Various structures are provided to allow a user's hand to support the rear region, typically by gripping either the frame, a drive housing, or a dedicated part on the frame.

Between the front and rear frame ends, a separate gripping assembly is provided to be engaged by a user's other hand.

The tool components are laid out and the weights thereof distributed so that with the user's two hands holding the portable tool, the portable tool is balanced in a starting upright orientation.

In one form of the forward gripping assembly, a ring shape, or "C" shape, is formed with a configuration that allows the user to grip the same at any of a number of different locations. This may facilitate supporting of the portable tool in different angular orientations around a lengthwise axis thereof.

With a portable tool that incorporates, for example, a trimmer head as the working unit, the structure that is engaged by the user's hand is preferably configured to allow comfortable reorientation of the portable tool by the user to allow strategic placement, and maneuvering of the trimmer head. For example, with the trimmer, certain tasks may be performed with the portable tool in the starting upright orientation. However, certain applications may require that the portable tool be used while being additionally pivoted to different orientations around laterally extending and/or lengthwise axes. Essentially, universal reorientation is desirable to facilitate use with a wide range of different site conditions.

Designers of this type of equipment focus initially upon holding structure that permits safe operation. At the same time, versatility is a critical design criteria as is user comfort, which is particularly an issue with professional landscapers that may be using portable tools for hours each day and in many different orientations.

Thus, designers of this type of portable tool focus on ergonomics. One feature that has been incorporated into gripping assemblies with C-shaped handles is to allow the handle to pivot around a laterally extending axis. This is done primarily to allow a laterally extending gripping length of the "C" shape to be shifted in both up-and-down and fore-and-aft directions, which is carried out as dictated by a particular capability and feel that is desired.

Further, it is known to orient a primary length of the C-shaped handle, that extends generally laterally, at a selected angle so that a vertical plane containing the line of this gripping length is non-orthogonal to a vertical plane through the lengthwise/fore-and-aft central axis of the frame. The angular relationship between these planes may change depending upon whether a user is right- or left-handed. This angled relationship allows the user's gripping hand to be in a more comfortable and natural position while supporting and operating the portable tool.

The industry continues to seek out alternative designs to facilitate positive and comfortable engagement of a portable tool by a user and one that will reduce fatigue with the portable tool being used in different orientations over extended periods.

SUMMARY OF THE INVENTION

In one form, the invention is directed to a portable tool having an upright starting orientation in which the portable tool has a top and bottom, a front and rear, and laterally spaced sides. The portable tool has an elongate frame with a front-to-rear length and a drive on the frame for operating a working unit. The portable tool is configured to be held by a user in the upright starting orientation with the user engaging: a) a first back region of the portable tool with one of the user's hands; and b) a second region of the portable tool forward of the first back region of the portable tool with the user's other hand to thereby allow the user to elevate and reposition the portable tool from the upright starting orientation to thereby controllably reposition the working unit on the frame that is configured to perform an operation. The first back region and second region are spaced along a front-to-rear first line. There is a gripping assembly at the second region of the portable tool having an elongate gripping length extending in a second line and around which the user's other hand can be wrapped. With the portable article in the upright starting orientation, a first vertical plane parallel to the first line is non-orthogonal to a second vertical plane parallel to the second line. The gripping assembly is configured so that with the portable tool in the first upright starting orientation the elongate gripping length can be moved selectively forwardly and rearwardly relative to the frame.

In one form, the frame has a lengthwise central axis that is parallel to the first line.

In one form, the lengthwise central axis is defined by a tubular length making up at least a part of the frame.

In one form, the gripping assembly is configured so that an angular relationship between the first and second vertical planes is maintained as the elongate gripping length is moved up and down relative to the frame.

In one form, with the portable tool in the upright starting orientation, the second line extends laterally across the sides of the elongate frame between the front and rear of the elongate frame.

In one form, the second line is in a third plane that is substantially orthogonal to the first vertical plane.

In one form, the second vertical plane deviates from an orthogonal relationship with the first vertical plane by an angle in the range of 4°-14°.

In one form, the second vertical plane deviates from an orthogonal relationship with the first vertical plane by an angle in the range of 4°-10°.

In one form, the second vertical plane deviates from an orthogonal relationship with the first vertical plane by an angle on the order of 7°.

In one form, the gripping assembly has a gripping component. The gripping component comprises the elongate gripping length and first and second side gripping lengths depending from the elongate gripping length with the portable tool in the upright starting orientation.

In one form, the elongate gripping length and first and second side gripping lengths reside substantially in a single plane.

In one form, the elongate frame is defined at least in part by a tubular length. The first and second side gripping lengths are spaced laterally from the tubular length on opposite sides of the frame.

In one form, the gripping component is selectively movable relative to the frame to change an angular orientation of the single plane relative to the elongate frame.

In one form, the first and second side gripping lengths extend to below the tubular length with the portable tool in the upright starting orientation.

In one form, the gripping component has first and second lengths projecting upwardly and extending respectively from the first and second side gripping lengths with the portable tool in the upright starting orientation.

In one form, the upwardly projecting lengths are connected to the frame to maintain the gripping component in a selected operative relationship with the frame.

In one form, the gripping component is mounted to the frame for relative guided pivoting movement. There is a connector on the gripping component and a connector on the frame that are releasably engageable to maintain the gripping component in a plurality of different selected angular positions relative to the frame.

In one form, the connectors on the gripping component and frame are cooperating keying elements on the gripping component and frame that are changeable selectively between a keyed relationship, wherein a selected angular position of the gripping component relative to the frame is fixed, and a released relationship wherein the angular position of the gripping component relative to the frame can be changed.

In one form, the portable tool has a fastener that can be placed selectively in first and second states. The fastener in the first state causes the keying elements to be maintained in the keyed relationship. The keying elements are changed from the keyed relationship into the released relationship as an incident of the fastener being changed from the first state into the second state.

In one form, the portable tool has a hand graspable actuator that is movable by a user to change the fastener between the first and second states.

DETAILED DESCRIPTION OF THE PREFERRED EMBODIMENT

Figure 1:
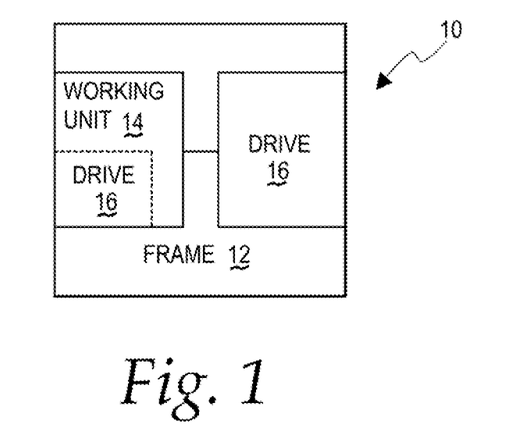
FIG. 1 is a schematic representation of a portable tool, of a type into which the present invention can be incorporated.

The present invention is directed to a portable tool, as shown generically at 10 in FIG. 1. The portable tool 10 consists of a frame 12 on which a working unit 14 is mounted. The working unit 14 is operated by a drive 16 on the frame 12 that is either spaced from the working unit or integrated into the working unit 14, as shown in dotted lines in FIG. 1.

The nature of the working unit 14 is not critical to the present invention, nor is the precise construction of the drive 16. As just examples, the working unit 14 might be a flexible line trimmer, a bladed trimmer, etc.

The drive 16 might be a fuel operated engine, a battery operated motor, etc.

Figure 2:
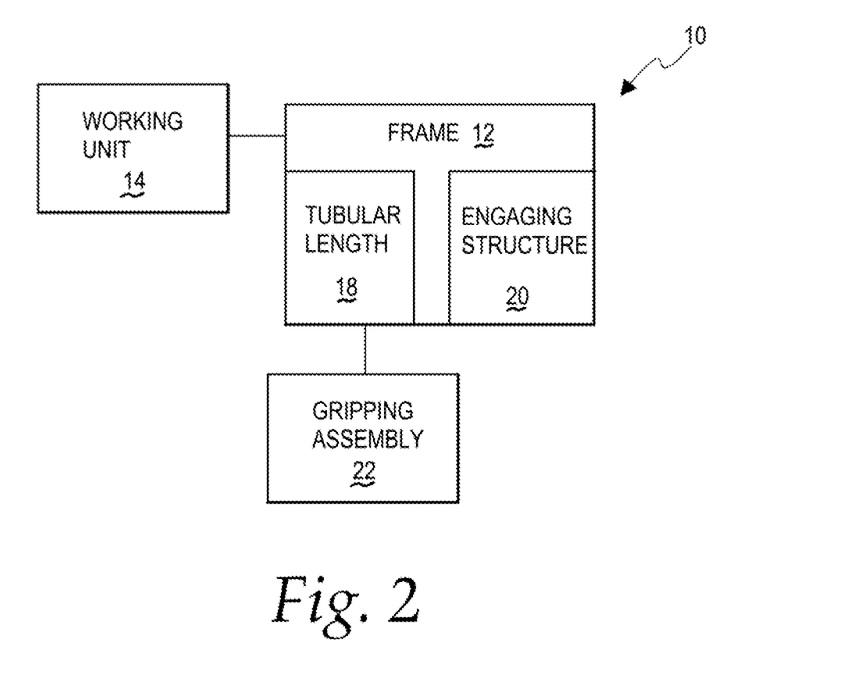
FIG. 2 is a schematic representation of a portable tool as in FIG. 1 and showing additional details thereof.

While the invention is not so limited, a subset of the portable tool 10 has a "stick tool" configuration, as shown in FIG. 2, with the frame 12 having a tubular length 18 with a central axis extending in a fore-and-aft direction. The tubular length 18 may define the entire frame length or a portion thereof.

In one exemplary form, as depicted, the working unit 14 is provided at a forward region of the frame 12.

To permit a user to lift and reposition the portable tool 10, the portable tool is configured to be engaged by the user's separate hands at spaced locations. As depicted, an engaging structure 20 is provided at a first back region of the portable tool 10 with a gripping assembly 22 at a second region of the portable tool 10 forward of the first back region. The engaging structure 20 may be a dedicated structure or a configuration of the frame 12 that allows engagement by a user's hand.

The gripping assembly 22 is a dedicated structure strategically placed with respect to the tubular length 18 to facilitate engagement by the user's other hand.

Figure 3:
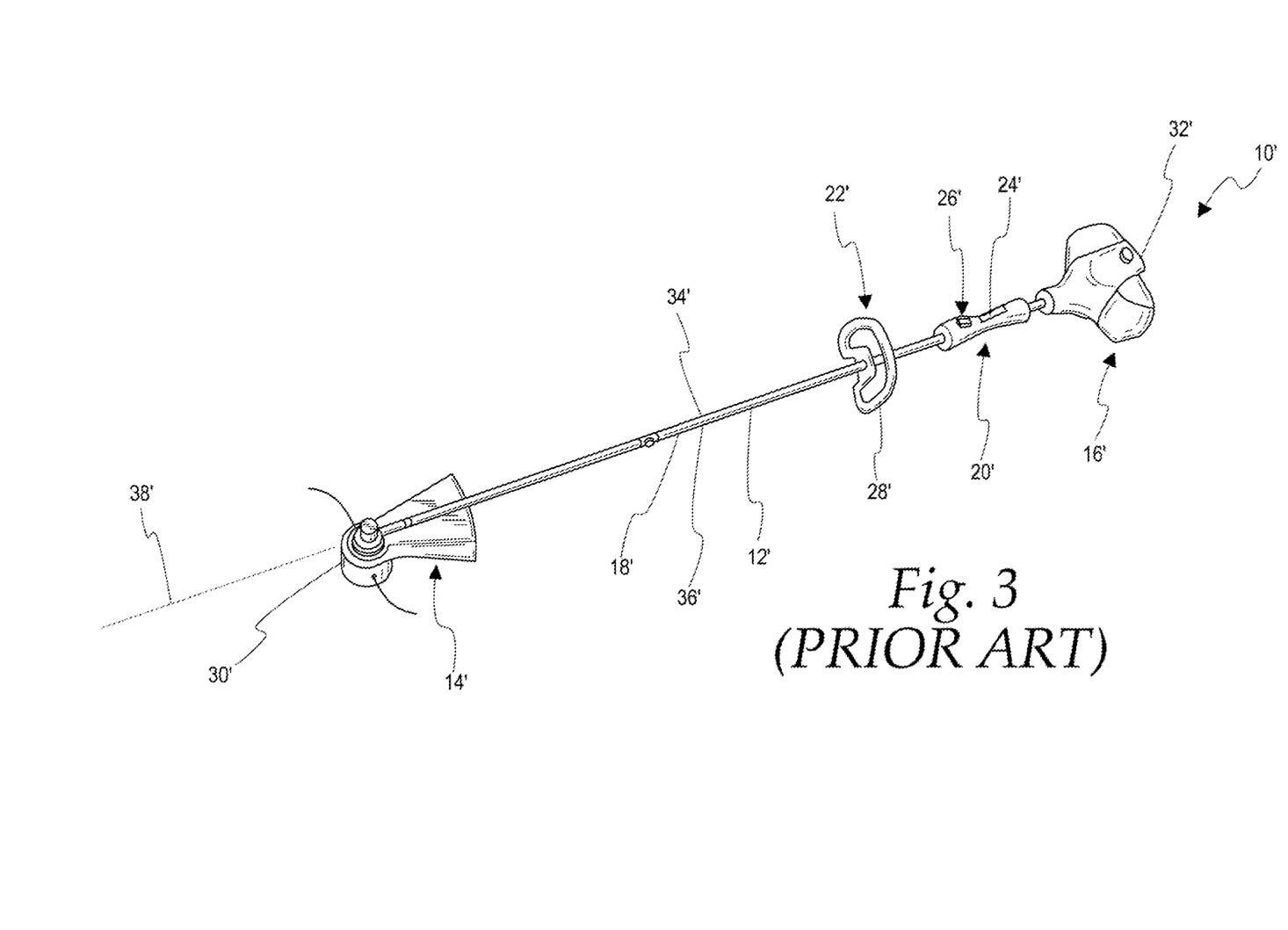
FIG. 3 is a perspective view of a commercially available portable tool of the type shown in FIGS. 1 and 2.

In FIG. 3, an exemplary prior art form of portable tool, corresponding to that at 10 in FIGS. 1 and 2, is shown at 10'. The depicted form is one that is commercially sold by the assignee herein.

The portable tool 10', which is commonly identified as a "stick tool", consists of an elongate frame 12' with a working unit 14' at a forward end of the frame 12' and in the form of a flexible line trimmer.

The working unit 14' is operated by a drive 16' at the rear end of the frame 12'. A hand engaging structure 20' is provided forwardly of the drive 16' and has a generally cylindrically shaped body 24' with a portion that can be surrounded by a hand of a user to allow one or more of the digits on the user's hand to engage controls shown at 26', typically including at least a throttle trigger.

A gripping assembly 22' is situated on the frame 12' forwardly of the engaging structure 20' and has a C-shaped portion 28' that allows a user to grasp the same at various locations.

As depicted, a tubular length 18' on the frame 12' extends substantially fully between the ends of the portable tool 10' and is connected to each of the working unit 14' and drive 16'.

The portable tool 10' is shown in an upright starting orientation, in which it is generally placed, as upon a horizontal, upwardly facing surface, for staging. In this upright starting orientation, the portable tool 10' has a front 30', a rear 32', and laterally spaced sides 34', 36'.

With the portable tool 10' in the upright starting orientation, a user engages the body 24' on the engaging structure 20' by wrapping his/her hand therearound in such a manner as to permit operation of the controls 26'. The other hand can engage the C-shaped portion 28' on the gripping assembly 22', whereupon the movement of the hands can be coordinated to elevate and maneuver the portable tool 10'. The components on the portable tool 10' are designed and located so that when lifted from the upright starting orientation, the weight of the portable tool 10' can be comfortably balanced.

By gripping different regions of the C-shaped portion 28, the angular position of the portable tool 10' around a lengthwise axis 38' of the frame, which in this case is the central axis of the tubular length 18', can be conveniently selected and comfortably maintained during operation, using essentially the same gripping style. At the same time, the gripping arrangement facilitates angling of the portable tool 10' around a laterally extending axis. Accordingly, substantially universal repositioning of the working unit 14' is facilitated by this design.

Figure 4:
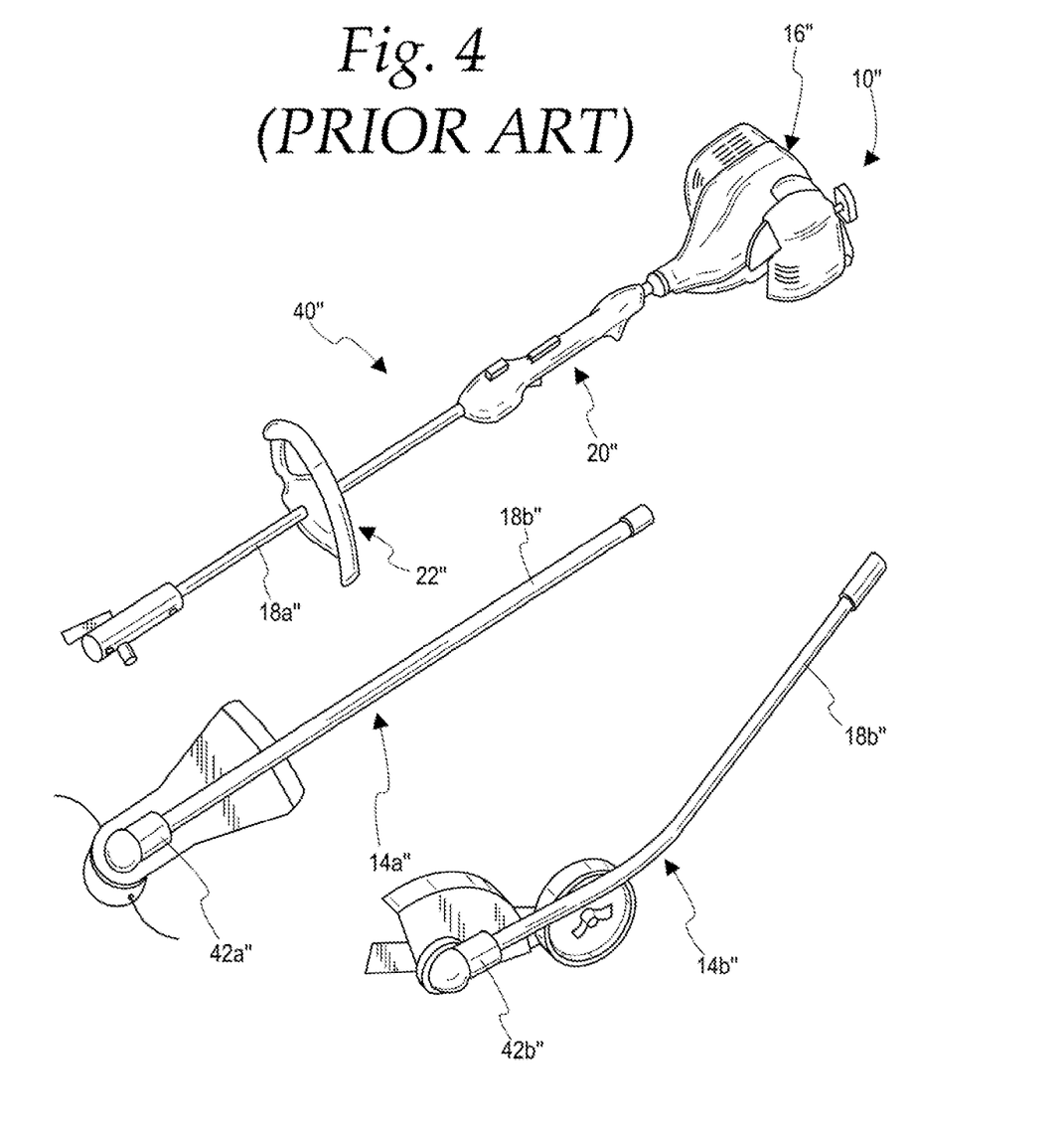
FIG. 4 is an exploded, perspective view of another conventional portable tool as shown in FIGS. 1 and 2 and having interchangeable working units.

In FIG. 4, a modified form of portable tool, offered commercially by the assignee herein, is shown at 10". The portable tool 10' has a modular drive unit 40" consisting of a drive 16", engagement structure 20", corresponding to the engagement structure 20' in FIG. 3, a gripping assembly 22", slightly modified from the gripping assembly 22' in FIG. 3, and a tubular length portion 18a".

The modular drive unit 40" is selectively engageable with different representative working unit attachments 14a", 14b", with the former performing the function of a portable line trimmer and the latter performing the function of a bladed edger. The working unit 14a" has a tubular length portion 18b" that is joinable to the tubular length part 18a" to couple the drive to a driven component 42a", whereupon the drive 16" will operate the working unit 14a".

The working unit 14b" is connected, in like fashion through a tubular length portion 18b", to the tubular length part 18a" to couple the drive 16" to a driven component 42b" on the working unit 14b" to operate the same.

The assignee herein offers additional working units 14 that are dedicated or interchangeably mountable in the FIG. 4 configuration.

The portable tools 10', 10" are exemplary forms of portable stick tools within the generic showing of FIG. 1. These forms are exemplary in nature only and are provided to show the environment for the hand engaging structures that are the focus of the present invention. The design of the frame 12 in FIG. 1 is not limited, nor is the nature of the working unit 14 or drive 16 therefor. As further noted, the inventive features are not limited to portable tools used in the landscape industry, as depicted in FIGS. 3 and 4.

Figures 5, 6:
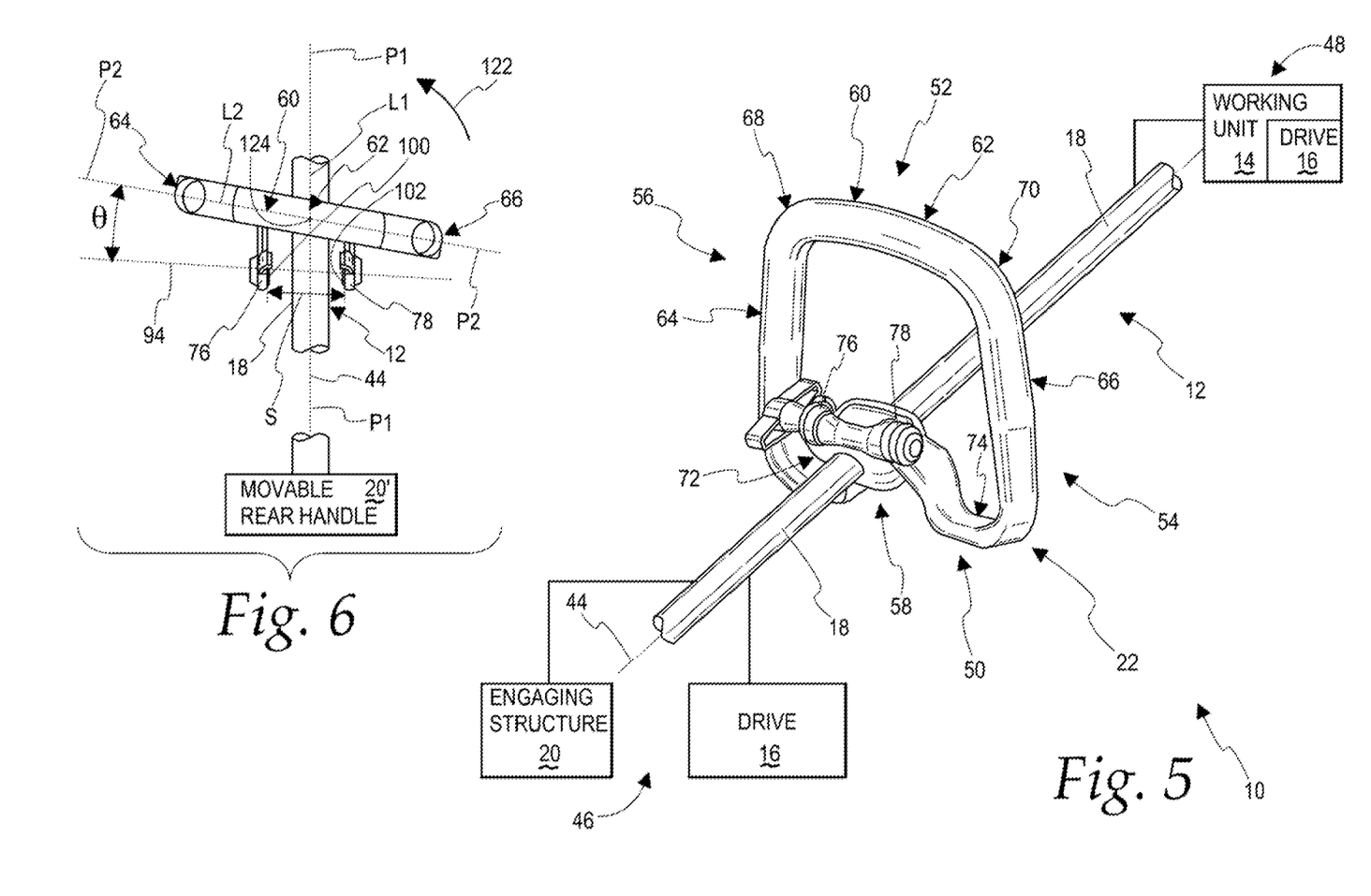
FIG. 5 is a partially schematic representation of a portable tool, as in FIGS. 1 and 2, and showing details of a gripping assembly, according to the invention.
FIG. 6 is a fragmentary, plan view of the portable tool and gripping assembly in FIG. 5 together with a graspable rear, pivoting handle.

Referring now to FIGS. 5-13, different preferred forms of the invention will be described. In FIG. 5, a gripping assembly 22 is connected to a tubular length 18 of a frame 12. The tubular length 18 has a central lengthwise axis 44 that extends in a first line L1 and defines the lengthwise axis for the overall portable tool 10.

As depicted, the tubular length 18 defines the primary structure of the frame 12 and is connected to the working unit 14. The rearmost hand engaging structure 20 is provided on the tubular length 18 and may take any form, such as, but not limited to, the form shown on the portable tools 10', 10". The drive 16 may be located near the rear end 46 of the portable tool 10 or may be incorporated into the working unit 14 at the front end 48 of the portable tool 10.

As in the prior art portable tools 10', 10", described above, the portable tool 10 has a starting upright orientation, as shown in FIGS. 5 and 6, wherein the portable tool 10 has a bottom 50, a top 52, and laterally spaced sides 54, 56. The overall portable tool 10, and the frame 12, have front-to-rear lengths.

As with the prior art portable tools 10', 10", described above, the portable tool 10 is configured to be held by a user in the upright starting orientation with the user engaging: a) the engaging structure 20 at a first back region of the portable tool 10 with one of the user's hands; and b) a second region at 58, forward of the first back region, with the user's other hand to thereby allow the user to elevate and reposition the portable tool 10 from the upright starting orientation to thereby controllably reposition the working unit 14. The first back region and second region are spaced along a front-to-rear first line, which in this case is coincident with the central axis 44.

The gripping assembly 22 consists of a C-shaped gripping component 60, with the "C" opening downward with the portable tool 10 in the upright starting orientation. The gripping component 60 consists of an elongate gripping length 62 and first and second side gripping lengths 64, 66 depending from the elongate gripping length 62.

The gripping component 60 has a substantially uniform cross-sectional shape along the grippable portions of the gripping length 62 and side gripping lengths 64, 66. This is not, however, a requirement. As depicted, the cross-sectional shape is substantially oval and of a dimension that a user's fingers can be wrapped therearound to positively maintain the gripping component 60 between the user's fingers and palm. The gripping length 62 transitions to the side gripping lengths 64, 66 at rounded corners 68, 70, respectively. All exposed surfaces are rounded so that no sharp projections are exposed that might cause discomfort to the user's hand.

As seen particularly in FIG. 6, the gripping length 62 and side gripping lengths 64, 66 reside substantially in a single plane. As seen also in FIG. 6, the side gripping lengths 64, 66 are spaced laterally from the tubular length 18 on opposite sides of the frame 12.

As seen in FIG. 5, the side gripping lengths 64, 66 extend to below the tubular length 18.

Figure 7:
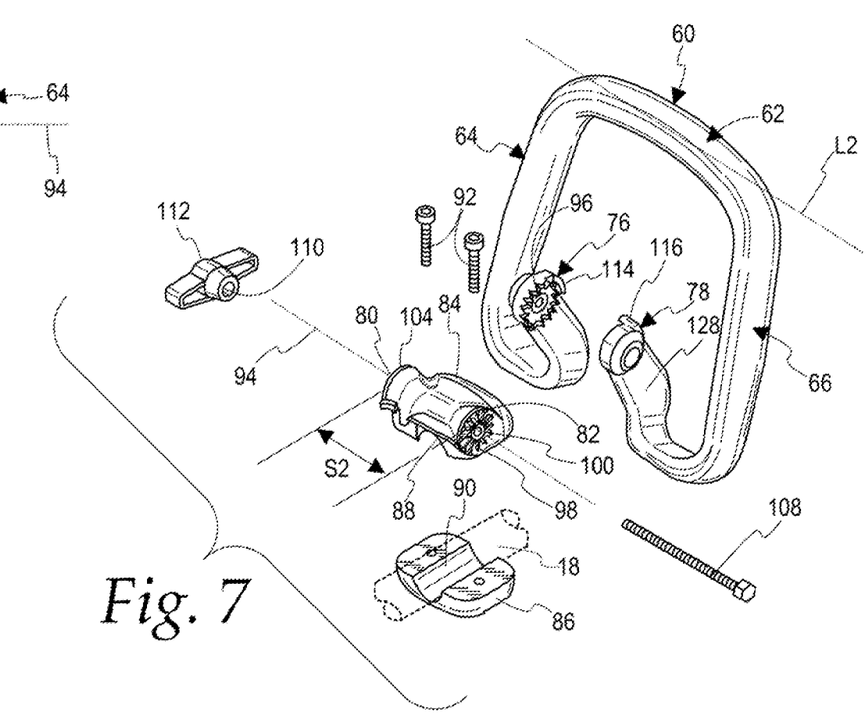
FIG. 7 is an exploded, perspective view of the gripping assembly in FIGS. 5 and 6.

First and second lengths 72, 74 of the gripping component 60 extend laterally inwardly from the depending gripping lengths 64, 66 and have portions projecting upwardly and terminating at connectors 76, 78, respectively.

The connectors 76, 78 cooperate respectively with connectors 80, 82 fixed to the tubular length 18. The connectors 80, 82 are provided on a mounting part 84 that cooperates with a mounting part 86 to fixedly capture a portion of the tubular length 18 therebetween. More particularly, the mounting part 84 has a curved seat 88 matched generally to the curvature of the tubular length 18, with the mounting part 86 having a like, oppositely opening seat 90. The mounting part 84 is placed on the top of the tubular length 18 with the tubular length 88 nesting in the curved seat 88.

The mounting part 86 engages the bottom of the tubular length 18 in like fashion, with the tubular part 18 nesting in the curved seat 90. The seats 88, 90 are dimensioned and configured so that by drawing the mounting parts 84, 86 towards each other, as through the depicted threaded fasteners 92, the tubular length 18 is firmly captively held between the mounting parts 84, 86.

A mounting axis 94 for the gripping component 60 is defined through the connectors 80, 82 on the mounting part 84.

With the mounting parts 84, 86 fixed in place, the connectors 76, 78 on the gripping component 60 can be placed in confronting relationship respectively with the connectors 80, 82.

The connectors 76, 78, 80, 82 have the same general configuration, with the exemplary connector 76 having keying elements 96 to engage keying elements that are the same as the keying elements 98 on the connector 82 that cooperates with the connector 78. The keying elements 96, 98 are annular arrays of teeth that produce gear shapes that can be meshed to fix different angular positions of the gripping component 60 around the mounting axis 94.

In the relaxed state for the gripping component 60, a spacing S (FIG. 6) between axially facing surfaces 100, 102 on the connectors 76, 78 is slightly greater than the spacing S2 (FIG. 7) between axially oppositely facing surfaces 104, 106 on the connectors 80, 82. It is possible that the spacing S can be slightly less than the spacing S2, whereupon the gripping component 60 may have to be slightly deformed to allow the connectors 76, 80 to be spread apart along the axis 94 to allow the surfaces 100, 102 to be placed in facing relationship with the surfaces 104, 106.

A fastener, in this case in the form of an elongate threaded bolt 108, is directed successively through the connectors 78, 82, 80, and 76 to be exposed axially beyond the connector 76. The fastener 108 establishes a pivot connection for the gripping component 60 whereby the gripping component 60 is prevented from being separated from the frame 12 and is guided in pivoting movement relative to the frame 12 with the connectors 76, 80 and 78, 82 disengaged.

A threaded connector 110 for the fastener 108 is integrated into a hand graspable actuator 112.

By tightening the connector 110 to the fastener 108 through manipulation of the frame 12, the keying elements 96 on the connector 76 are placed in keyed relationship with keying elements on the connector 80, corresponding to the keying elements 98, with the keying elements 98 on the connector 82 placed in keyed relationship with keying elements on the connector 78, corresponding to the keying elements 96 on the connector 76. The cooperating keying elements thus mesh and prevent pivoting of the gripping component 60 relative to the fixed connectors 80, 82 on the frame 12.

The tightened fastener 108 is in a first state. By loosening the connector 110 on the fastener 108, the fastener is placed in a second state, wherein the gripping component 60 is allowed to pivot about the axis 94 relative to the frame 12 by reason of the keying elements 96, 98 moving out of the keyed relationship and into a released relationship wherein the connectors 76, 78 can pivot respectively relative to the connectors 80, 82.

Accordingly, by changing the fastener 108 from its first state into its second state, the keying elements can be moved out of keyed relationship into a released relationship whereupon the gripping component 60 is allowed to pivot around the axis 94 relative to the frame 12 into a desired angular relationship with the frame 12. With the desired relationship selected, the fastener 108 can be changed from its second state back into its first state, which meshes the keying elements in a different keyed relationship.

Arcuate shrouds 114, 116 conform at least nominally to the radially facing surfaces on the connectors 80, 82, respectively, to facilitate initial assembly of the gripping component 60 and stably guide relative movement between the gripping component 60 and the connectors 80, 82.

As depicted, the elongate gripping length 62 has a generally straight shape extending in a second line L2 in a lateral direction. As depicted, the elongate gripping length 62 has a slight curvature, with its shape and orientation nonetheless generally identifiable by the line L2. The second line L2 extends laterally across the sides of the frame 12 at a location between the front and rear thereof.

In a preferred form, with the portable article 10 in the upright starting orientation, a first vertical plane P1 through or parallel to the first line L1 is non-orthogonal to a second vertical plane P2 intersecting or parallel to the second line L2.

By pivoting the gripping component 60 around the axis 94, the gripping length 62 is moved vertically and in a fore-and-aft direction relative to the frame 12 while maintaining the angular relationship between the first and second vertical planes P1, P2.

As can be seen in FIG. 6, as the gripping component is pivoted, an angular orientation of the vertical plane P2 relative to the frame 12 occurs.

While the line L2 is shown generally horizontal such that it resides in a third plane P3 that is substantially orthogonal to the first vertical plane P1, a different orientation of the gripping length 62 is contemplated.

In one preferred form, the second vertical plane P2 deviates from an orthogonal relationship with the first vertical plane P1 by an angle θ in the range of 4° to 14°.

In another form, this range is preferably 4° to 10°.

In a still further form, the deviation is an angle θ on the order of 7°.

Figure 14:
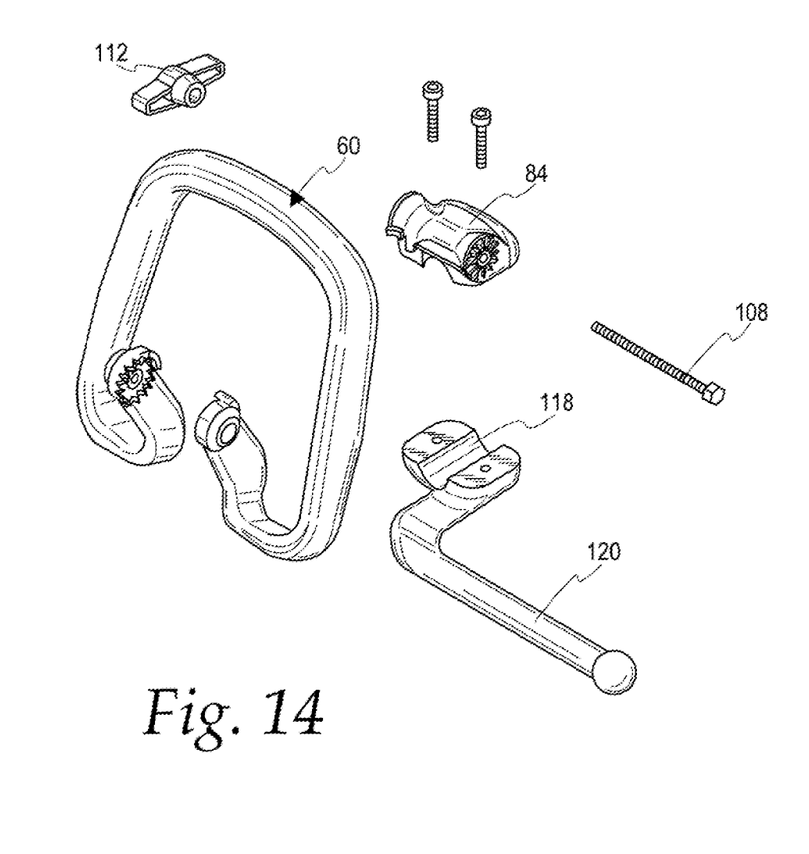
FIG. 14 is an exploded, perspective view as in FIG. 7 and showing a modified form of gripping assembly incorporating a barrier bar.

In FIG. 14, a modified form of the gripping assembly is shown wherein the mounting part 86 is replaced with a mounting part 118 having an integrally formed, laterally projecting barrier bar 120. Barrier bars provide additional safety to the user while facilitating more leveraged control of the portable tool 10. The other components, including the mounting part 84, the fastener 108, actuator 112, gripping component 60, etc., are configured and assembled as previously described.

The depicted embodiment may be particularly desirable for one specific "handed" operator. The elongate gripping length 62 may be reoriented to accommodate an opposite handed person. That is, as seen in FIG. 6, the line L2 may be turned in the direction of the arrow 122 around a vertical axis 124 through two times the angle θ.

For positive gripping and greater comfort, a soft material, such as rubber, may be overmolded on graspable exposed surfaces of the gripping lengths 62, 64, 66 as shown at 125.

Figures 9, 10, 11, 12, 13:
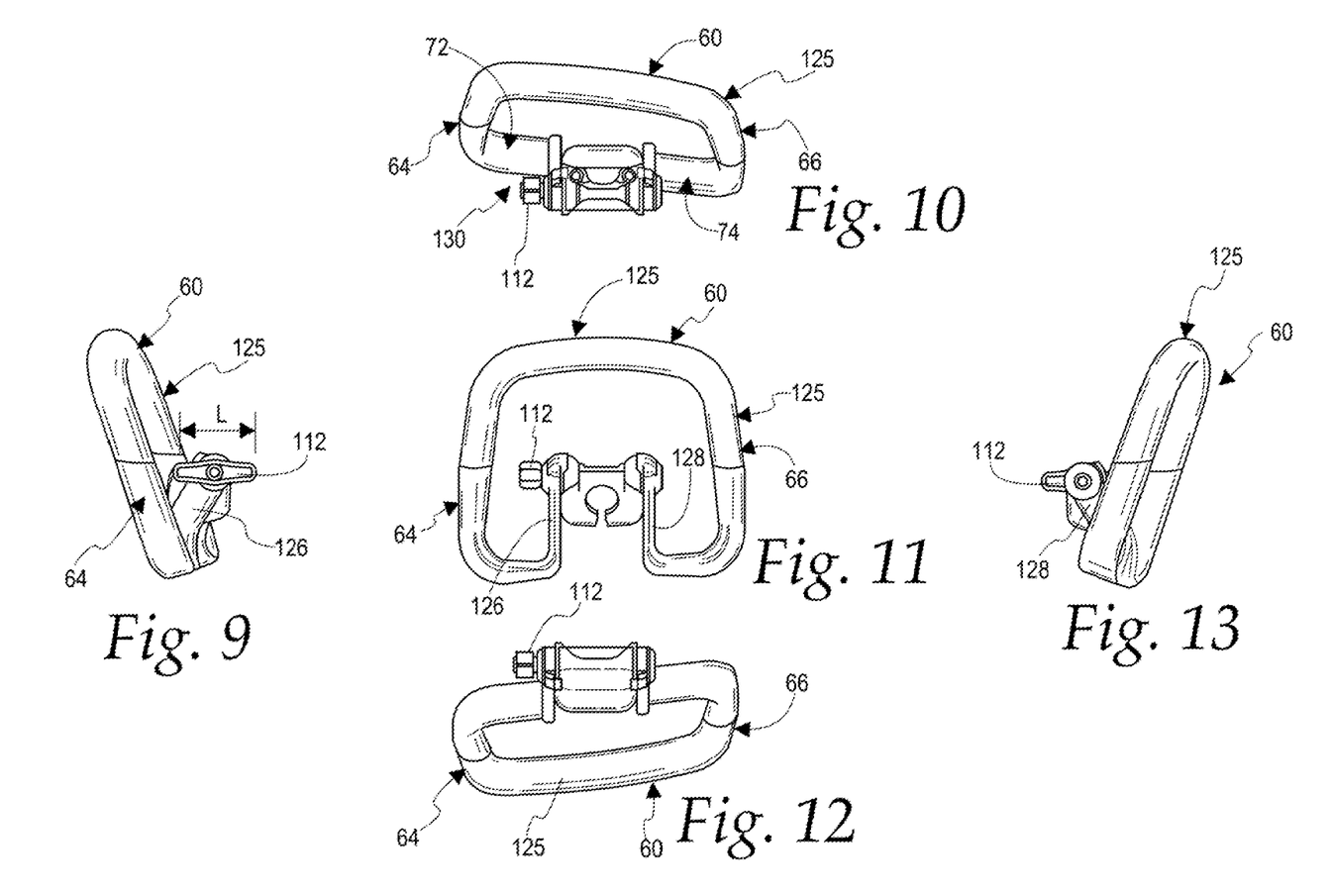
FIGS. 9-13 are different perspective views of the assembled gripping assembly as shown in FIGS. 5-8.

As seen in FIGS. 9, 10, and 13, the lengths 72, 74 have cantilevered projecting portions 126, 128 that extend angularly away from the plane in which the gripping lengths 62, 64, 66 reside, thereby creating an empty volume at 130 adequate to accept a relatively large actuator 112 thereby allowing the user to apply a substantial torque thereto. For example, the actuator 112 may have a length L (FIG. 9) of 2-3 inches without obstructing access to and engagement of the gripping component 60. This facilitates convenient adjustment of the gripping assembly 22 while on a job site, whereas units, such as those in FIGS. 3 and 4, generally have handles/gripping assemblies that are not designed to be pivoted but may be moved lengthwise only by loosening fasteners with separate tools.

To add further versatility, as shown in FIG. 6, a movable rear handle 140 may define the rear engaging structure 20'. The rear handle 20' may be graspable and pivotable around one or more axes, such as laterally and/or vertically extending axes.

Figure 8:
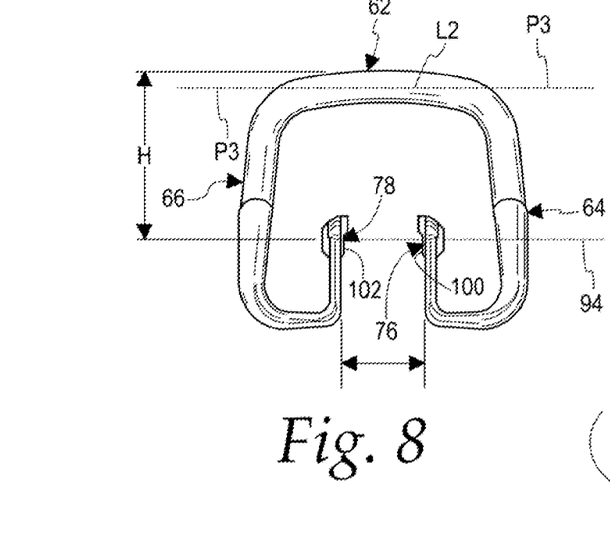
FIG. 8 is a rear elevation view of a part of the gripping assembly as shown in FIGS. 5-7.

For added comfort, particularly for persons with back issues, the gripping assembly dimension H in FIG. 8 is at least 4.5 inches and more preferably at least 5 inches. The top of the gripping length is even further above the tubular length 18.

The foregoing disclosure of specific embodiments is intended to be illustrative of the broad concepts comprehended by the invention.

The invention claimed is:

1. A portable tool having an upright starting orientation in which the portable tool has a top and bottom, a front and rear, and laterally spaced sides, the portable tool comprising:
   an elongate frame with a front-to-rear length,
   the portable tool configured to be held by a user in the upright starting orientation with the user engaging: a) a first back region of the portable tool with one of the user's hands; and b) a second region of the portable tool forward of the first back region of the portable tool with the user's other hand to thereby allow the user to elevate and reposition the portable tool from the upright starting orientation to thereby controllably reposition a working unit on the frame configured to perform an operation; and
   a drive on the frame for operating the working unit,
   wherein the first back region and second region are spaced along a front-to-rear first line,
   wherein there is a gripping assembly at the second region of the portable tool having an elongate gripping length extending in a second line and around which the user's other hand can be wrapped,
   wherein the gripping length is part of a gripping component that is connected for guided pivoting movement relative to the frame in opposite directions about an axis to thereby allow the elongate gripping length to be selectively moved towards and away from the frame,
   wherein with the portable tool in the upright starting orientation, a first vertical plane parallel to the first line is in a non-orthogonal relationship to a second vertical plane parallel to the second line,
   wherein the non-orthogonal relationship is at all times permanently maintained and non-adjustable.

2. The portable tool according to claim 1 wherein the frame has a lengthwise central axis that is parallel to the first line.

3. The portable tool according to claim 2 wherein the lengthwise central axis is defined by a tubular length making up at least a part of the frame.

4. The portable tool according to claim 3 wherein with the portable tool in the upright starting orientation, the second line extends laterally across the sides of the elongate frame between the front and rear of the elongate frame.

5. The portable tool according to claim 4 wherein the second line is in a third plane that is substantially orthogonal to the first vertical plane.

6. The portable tool according to claim 1 wherein the second vertical plane deviates from an orthogonal relationship with the first vertical plane by an angle in the range of 4°-14°.

7. The portable tool according to claim 1 wherein the second vertical plane deviates from an orthogonal relationship with the first vertical plane by an angle in the range of 4°-10°.

8. The portable tool according to claim 1 wherein the second vertical plane deviates from an orthogonal relationship with the first vertical plane by an angle on the order of 7°.

9. The portable tool according to claim 1 wherein the gripping component comprises first and second side gripping lengths depending from the elongate gripping length with the portable tool in the upright starting orientation.

10. The portable tool according to claim 9 wherein the elongate gripping length and first and second side gripping lengths reside substantially in a single plane.

11. The portable tool according to claim 9 wherein the elongate frame is defined at least in part by a tubular length and the first and second side gripping lengths are spaced laterally from the tubular length on opposite sides of the frame.

12. The portable tool according to claim 10 wherein the gripping component is selectively movable relative to the frame to change an angular orientation of the single plane relative to the elongate frame.

13. The portable tool according to claim 11 wherein the first and second side gripping lengths extend to below the tubular length with the portable tool in the upright starting orientation.

14. The portable tool according to claim 13 wherein the gripping component comprises first and second lengths projecting upwardly and extending respectively from the first and second side gripping lengths with the portable tool in the upright starting orientation.

15. The portable tool according to claim 14 wherein the upwardly projecting lengths are connected to the frame to maintain the gripping component in a selected operative relationship with the frame.

16. The portable tool according to claim 15 wherein the gripping component is mounted to the frame for relative guided pivoting movement, there is a connector on the gripping component and a connector on the frame that are releasably engageable to maintain the gripping component in a plurality of different selected angular positions relative to the frame.

17. The portable tool according to claim 16 wherein the connectors on the gripping component and frame comprise cooperating keying elements on the gripping component and frame that are changeable selectively between a keyed relationship wherein a selected angular position of the gripping component relative to the frame is fixed and a released relationship wherein the angular position of the gripping component relative to the frame can be changed.

18. The portable tool according to claim 17 wherein the portable tool comprises a fastener that can be placed selectively in first and second states, the fastener in the first state causing the keying elements to be maintained in the keyed relationship, the keying elements changed from the keyed relationship into the released relationship as an incident of the fastener being changed from the first state into the second state.

19. The portable tool according to claim 18 wherein the portable tool comprises a hand graspable actuator that is movable by a user to change the fastener between the first and second states.

20. The portable tool according to claim 1 wherein the gripping assembly is configured so that with the portable tool in the first upright starting orientation the elongate gripping length can be moved selectively forwardly and rearwardly relative to the frame.

* * * * *